United States Patent
Albertin et al.

(10) Patent No.: US 10,365,386 B2
(45) Date of Patent: Jul. 30, 2019

(54) SYSTEM AND METHOD FOR SALT SURFACE UPDATING VIA WAVEFIELD REDATUMING

(71) Applicant: CHEVRON U.S.A. INC., San Ramon, CA (US)

(72) Inventors: Uwe Karsten Albertin, Houston, TX (US); Chaoshun Hu, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 230 days.

(21) Appl. No.: 15/084,627

(22) Filed: Mar. 30, 2016

(65) Prior Publication Data
US 2016/0291177 A1    Oct. 6, 2016

Related U.S. Application Data

(60) Provisional application No. 62/140,020, filed on Mar. 30, 2015.

(51) Int. Cl.
*G01V 1/28*  (2006.01)
*G01V 1/30*  (2006.01)

(52) U.S. Cl.
CPC .............. *G01V 1/282* (2013.01); *G01V 1/303* (2013.01); *G01V 2210/6222* (2013.01); *G01V 2210/679* (2013.01)

(58) Field of Classification Search
CPC ..................................................... G01V 1/282
See application file for complete search history.

(56) References Cited

U.S. PATENT DOCUMENTS

| | | | | |
|---|---|---|---|---|
| 6,418,380 B1* | 7/2002 | Pica | ......................... | G01V 1/28 702/18 |
| 6,778,909 B1* | 8/2004 | Popovici | .................. | G01V 1/28 702/17 |
| 2004/0172199 A1* | 9/2004 | Chavarria | ................ | G01V 1/28 702/14 |
| 2008/0165619 A1* | 7/2008 | Bachrach | ................. | G01V 1/30 367/38 |
| 2009/0240438 A1* | 9/2009 | Wang | ....................... | G01V 1/28 702/14 |
| 2014/0142859 A1* | 5/2014 | Lu | .......................... | G01V 1/282 702/16 |
| 2014/0278299 A1 | 9/2014 | Hill | | |
| 2015/0205006 A1* | 7/2015 | Maerten | ............... | G01V 99/005 703/2 |

OTHER PUBLICATIONS

Biondi, B., and P. Sava, 1999, Wave equation migration velocity analysis: 69th Annual International Meeting, SEG, Expanded Abstracts, 1723-1726.

(Continued)

*Primary Examiner* — Moazzam Hossain
(74) *Attorney, Agent, or Firm* — Marie L. Clapp (57) ABSTRACT

A method is described for improving subsalt seismic imaging using wavefield redatuming. The method redatums the source wavefield and receiver wavefield to the salt surface. It cross-correlates the redatumed wavefields and uses the time cross-correlations to update the salt surface. The method may be executed by a computer system.

9 Claims, 4 Drawing Sheets

(56) References Cited

OTHER PUBLICATIONS

Etgen, J. T., I. Ahmed, and M. Zhou, 2014, Seismic adaptive optics: 84th Annual International Meeting, SEG, Expanded Abstracts, 4411-4415.

Shan, G., Y. Wang, and U. Albertin, 2014, Wave equation migration velocity analysis by wavefield decomposition: 84th Annual International Meeting, SEG, Expanded Abstracts, 4680-4685.

Sirgue, L., and R. G. Pratt, 2003, Waveform inversion under realistic conditions: Mitigation of nonlinearity: 83rd Annual International Meeting, SEG, Expanded Abstracts, 694-697.

Stork, C., 1992, Reflection tomography in the postmigrated domain: Geophysics, 57, 680-692.

* cited by examiner

SYSTEM AND METHOD FOR SALT SURFACE UPDATING VIA WAVEFIELD REDATUMING

TECHNICAL FIELD

The disclosed embodiments relate generally to techniques for deriving locations of salt body surfaces in the Earth's subsurface from geophysical seismic data and, in particular, to a method of deriving locations of salt body surfaces using seismic wavefield redatuming.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. This imaging procedure may involve propagation of wavefields through a velocity model of the subsurface, also called forward modeling. In complex subsurface areas, such as near salt bodies, seismic images are often contaminated with artifacts.

There exists a need for improved seismic images that will allow better seismic interpretation of potential hydrocarbon reservoirs so that decisions regarding reservoir management, including drilling wells, may be made.

SUMMARY

In accordance with some embodiments, a method of subsalt seismic imaging may include receiving a seismic dataset representative of a subsurface volume of interest including a salt body and at least one initial subsurface model, redatuming a source wavefield and a receiver wavefield to a surface of the salt body to create a redatumed source wavefield and a redatumed receiver wavefield, cross-correlating the redatumed source wavefield and the redatumed receiver wavefield to produce a time cross-correlation window for each location on the surface of the salt body, analyzing time differences in the time cross-correlation window to determine errors in location of the surface of the salt body, updating the surface of the salt body to generate a more accurate subsurface model, and using the more accurate subsurface model for subsalt seismic imaging.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic imaging. These embodiments are designed to be of particular use for seismic imaging of subsurface volumes in geologically complex areas such as under or near salt bodies.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. Processing seismic data and generating seismic images is a very complicated procedure. Approximations must be made in many steps. Conventional seismic imaging often uses imaging conditions that cannot completely account for wavefield behavior in complex areas, such as near salt, resulting in artifacts in the seismic image. It is often very difficult to properly locate the salt surface, resulting in incorrect velocity models being used for seismic imaging and poor imaging results near and below the salt bodies.

A great deal of salt-related model building cycle-time is devoted to fine-tuning the small-scale details of the salt geometry, especially along the top and bottom of salt, in order to get an optimal subsalt imaging. Recovering these short wavelength features is very challenging in velocity model building and is beyond the capability of traditional migration velocity analysis tools. The present invention incorporates the adjustment of short-wavelength salt geometry into the seismic image procedure. This approach can enhance subsalt imaging by first correcting the salt geometry by estimating time delays from reverse time migration (RTM) time-lag gathers, and then updating the top of salt automatically by local time-to-depth mapping and surface warping. The effectiveness of this new implementation is demonstrated using a 2D synthetic dataset and a 3D field data example.

Seismic depth imaging in subsalt areas remains a significant challenge due to the high velocity contrast between sediment and salt. Typical depth-imaging processing flows utilize a top-down approach to subsalt imaging. First, the sediment velocity above salt is estimated. A depth image is then obtained using the sediment velocities, followed by manual interpretation of the image to determine top-salt location. Salt velocity is then inserted into the model below top salt, followed by another depth migration using this salt-flooded velocity model. Manual interpretation of the image is then employed to determine base salt location. The model is finally modified to truncate salt velocities at base of salt, and the subsalt image is lastly obtained after constructing a subsalt velocity model. Effective subsalt imaging therefore requires accurate positioning of both the top and the base salt events in the model. The processing step of interpreting salt boundaries is often a time consuming part of the depth-imaging workflow, and correct interpretation of salt position is often difficult in highly complex areas. This leads to wrong salt geometries in the model, and subsequent loss of fidelity in the seismic image.

Previous efforts in solving this problem focus on using various techniques of reflection tomography (Stork, 1992) or wave-equation based migration velocity analysis (WEMVA) (Biondi and Sava, 1999; Shan et al. 2013, 2014) to invert velocity models in image or data domain using ray tracing, one-way or two-way propagators. Meanwhile, it has been proposed to use waveform inversion (Sirgue and Pratt, 2003) to update such imperfections in salt boundaries. However, it is difficult to get the inversion to high enough frequency to get a truly sharp boundary in practice, and Gibbs phenomena at the salt boundary also cause issues. Recently Hill (2014) used beam inversion to update the velocity model in interactive imaging platform. Etgen et al. (2014) proposed a seismic adaptive optics approach to analyze time or depth extrapolated wavefields for the tell-tale signature of high-contrast short-wavelength velocity structure.

The present invention is a new method to incorporate the automatic adjustment of short wavelength salt geometry into production seismic imaging procedure. It assumes that velocities down to top salt are essentially correct. Recall that in a standard imaging condition, source and receiver wavefields are supposed to be spatially coincident at zero time. Hence, if the model is incorrect, spatial coincidence corresponds to an event positioned away from zero time. To update a salt boundary, the present invention examines the time shift from zero associated with the crosscorrelation of back-propagated data and forward-modeled wavefields at the position of the salt boundary. Time error in this cross-correlation is an indicator of salt boundary error. Poor crosscorrelation may be a further indicator that the boundary should not be treated as a sharp boundary, or that other velocity effects above salt have not been accounted for. The analysis can be done with or without the salt inserted into the velocity model on either the receiver or source legs of the propagation. If salt is inserted in this fashion, doubling or tripling of the salt event will be observed, and the position of the salt will be correct when these events all become coincident at zero time.

Benchmark tests shown herein demonstrate that incorporation of the automatic adjustment of short-wavelength salt geometry into seismic image procedure can produce high-quality subsalt image for complicated models where short wavelength imperfections exist and has a potential use in production workflows.

To resolve the problems and challenges associated with creating an accurate top salt surface, the present approach includes two major procedures: time delay estimation, and updating of the top salt surface.

Generally wavefield datuming can use different model configurations, such as smoothed or non-smoothed, with salt or without salt, to do forward and reverse wavefield propagation. To simplify the description, the present method assumes that an initial interpretation of the salt boundary has been done following initial sediment velocity work and depth imaging. If the method is to be applied to the top salt surface, a sediment flood model is assumed. If the method is to be applied to base salt that is imaged with energy passing through salt, a salt-flood model is assumed. Using the interpreted salt surface, for the receiver data associated with each shot, the source wavefield is propagated into the subsurface using standard time propagation methods, and the wavefield is captured on the interpreted salt boundary. The receiver data for this shot is then back-propagated into the subsurface using standard time propagation methods and is captured on the interpreted salt boundary. This portion of the method constitutes the redatuming of the wavefields to the salt surface. For every location on the salt surface the wavefields are then cross-correlated in time to produce a time-crosscorrelation window. This computation is repeated for every shot, and the results are summed. According to the standard zero-time imaging, if the salt boundary is in the correct position in depth in the model, it should appear at zero time in the time-crosscorrelation window. If it does not, the position of the salt is in error, and the surface can either be interpretively repicked in depth using standard methods, or alternatively, can be interpretively or automatically picked in the time window. In one embodiment, an autopicking procedure may be used to produce time picks away from zero time. One advantage to such picking is that the zero time positions is always in the center of the window, so assuming a single salt event, then picking can be done by searching for the first event away from zero time either above or below zero time. Once picks in time window have been obtained, the present method uses a local mapping of the salt surface based on local time-to-depth conversion to account for the time difference between the current position of the salt in the time-crosscorrelation window, and the zero time location, and repositions the salt surface. The entire process can then be repeated, and if the new position of the salt still has time errors, the repositioning is repeated until the position of the salt is consistent with zero time.

In one embodiment, instead of providing either a pure grid-based model or a model based on triangulated surfaces, a hybrid model representation may be used where both gridded volumes representing volumetric velocity and gridded or triangulated surface representing salt boundaries are stored independently. Thus the model geometry can be easily changed by updating the single and multi-valued surface positions, followed by a standard fill construction that creates the final global volumetric grid used for imaging.

After obtaining the time delay picks, the present method may convert them to the positional shifts on the salt boundary by a local mapping. This may be done by starting with the background sediment velocity and then shifting the pointset associated with the surface by converting the time shift to an effect position in the salt that accounts for the time shift. Due to noise associated with the data and picks, one embodiment uses a Discrete Smooth Interpolation (DSI) framework for creating, fairing and editing triangulated surfaces, while honoring a set of constraints. The squared discrete Laplacian criterion minimized by DSI is an objective function similar to the bending energy of a thin-plate which can be expressed as the following linear equations, $$\begin{cases} Ax = d \\ \nabla^2 x = 0 \end{cases},$$

where A represents the topological geometry relation, x represents the vector location in vertex points to be interpolated, and d is the updated location of predefined sparse nodes. First we obtain the update location d from the time picks, and then solve for the positional shifts x that satisfy the constraint.

Using the hybrid model and surface warping with DSI method, the present method can reduce depth anomalies from time delay estimation in time-crosscorrelation window and effectively adjust the small-scale or short wavelength features in salt geometry.

Figure 1:
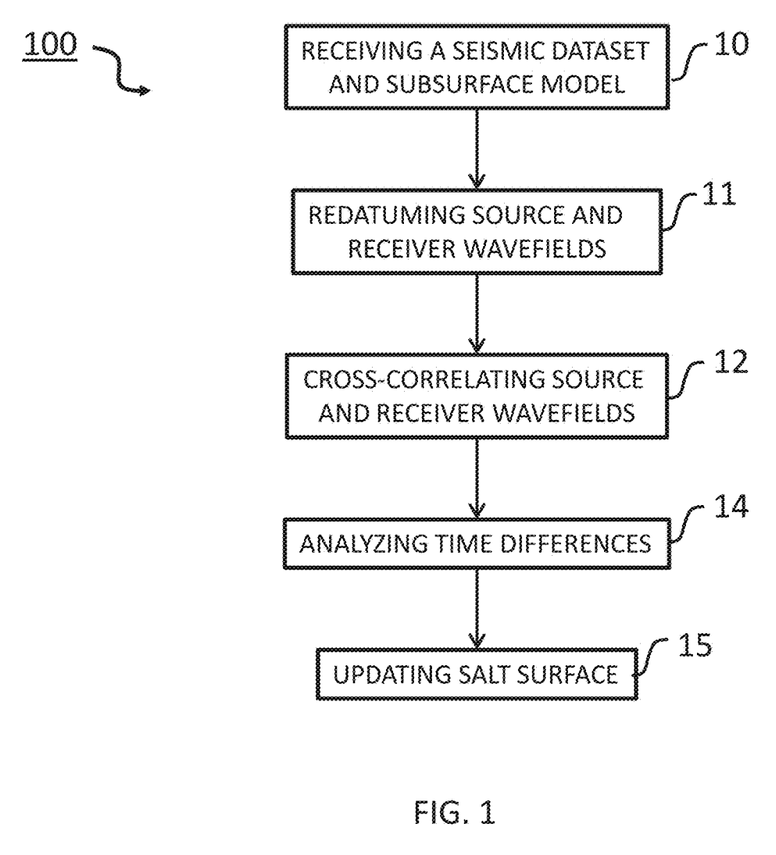
FIG. 1 illustrates a flowchart of a method of salt surface updating using wavefield datuming, in accordance with some embodiments.
Figure 2A:
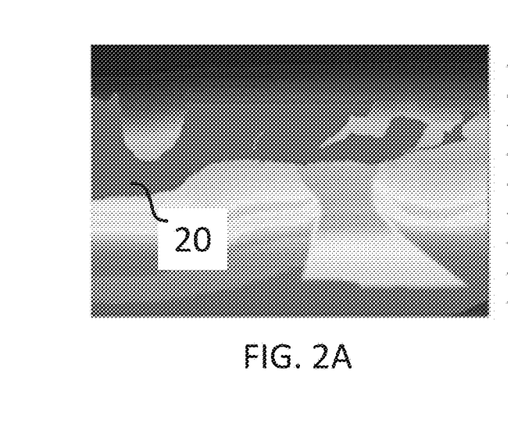
FIGS. 2A-2C illustrate elements of an embodiment of the present invention.
Figure 2B:
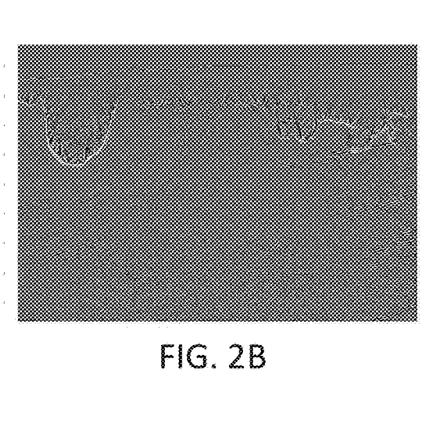

FIG. 1 illustrates a flowchart of a method 100 for salt surface updating. At operation 10, a seismic dataset, likely a depth migrated image, is received. As previously described, the seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data. The seismic data includes an initial interpreted salt surface. At least one subsurface model is also received. The subsurface model may be, for example, a seismic velocity model. The velocity model may consist of sediment velocities, salt velocities, or a combination. It may contain a representation of the salt body or may not contain the salt. It may be a smoothed representation of any of these velocities. Furthermore, the subsurface model may include attenuation information. Although the subsurface model is some form of "best guess" those of skill in the art are aware that subsurface models often contain errors, particularly in complex areas such as those near salt boundaries and often in the exact positioning of the salt surfaces. An example of an initial subsurface model that is a velocity model can be seen in FIG. 2A. The salt body 20 has a flat top through the center of the model. FIG. 2B is the seismic dataset, in this case a reverse time migration image, produced using the velocity model of FIG. 2A.

At operation 11, the source wavefield and the receiver wavefield are redatumed via forward and reverse wavefield propagation to the interpreted salt surface. The wavefield propagation uses one or more of the subsurface models. The redatumed source and receiver wavefields are captured at the interpreted salt surface.

Figure 2C:
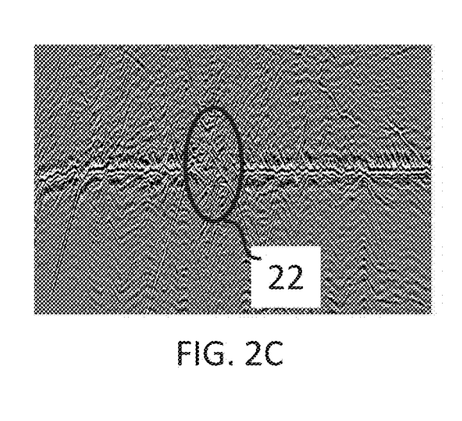

At operation 12, the redatumed source wavefield and the redatumed receiver wavefield that have been captured at the interpreted salt surface are cross-correlated in time at each point on the salt surface. This produces a time-cross-correlation window. This is repeated for every shot of interest and the results are summed. If the interpreted salt surface is located at the true salt surface, the cross-correlation of the redatumed source and receiver wavefields will appear at zero time in the time-cross-correlation window. FIG. 2C shows the time-cross-correlation window for the example using FIGS. 2A and 2B. The zero-time is in the middle of the window. The cross-correlation is particularly poor in region 22.

Operation 14 looks for time differences in the time windows, using them to identify locations where the interpreted salt surface is not correct. This operation would analyze the time differences in region 22 to determine how the salt surface is incorrect (too high or too low).

Operation 15 updates the salt surface based on the time differences from the time windows. If the subsurface model is a hybrid model that uses both grid-based and triangulated facet models to describe the subsurface, it can be updated by changing the single and multi-valued grids only. This may be done, for example, by surface warping using Discrete Smooth Interpolation.

Figure 3A:
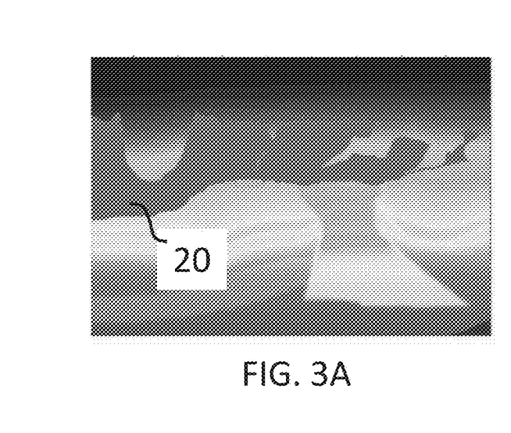
FIGS. 3A-3B illustrate elements of the results of an embodiment.
Figure 3B:
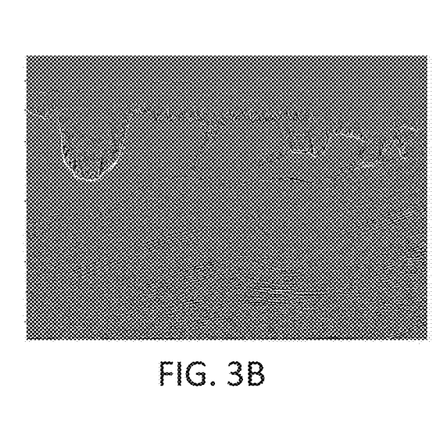
Figure 4:
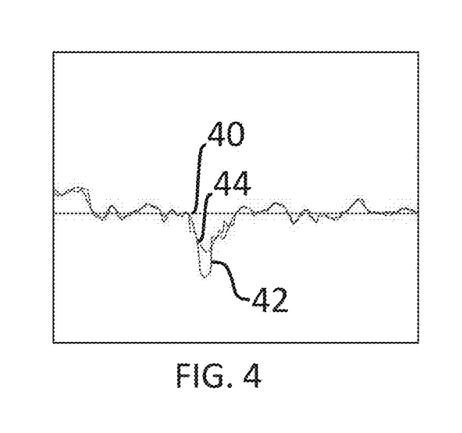
FIG. 4 is a comparison of the input and output of an embodiment.

FIG. 3A shows the updated subsurface model. Note that salt body 20 now has a rugose surface. The reverse time migration image (FIG. 3B) generated using this model has better focusing. FIG. 4 compares 2-D curves of the salt top from FIG. 2A as flat line 40, the salt top from FIG. 3A as curve 44, and the true salt top as line 42. Note that the result of the present invention, curve 44, is much more accurate.

Figure 5A:
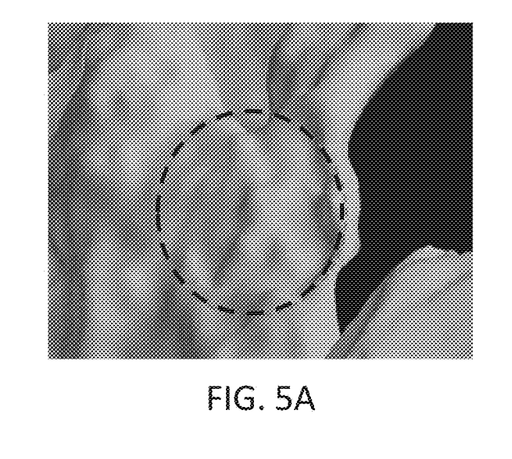
FIGS. 5A-5D illustrate another set of elements of an embodiment.
Figure 5B:
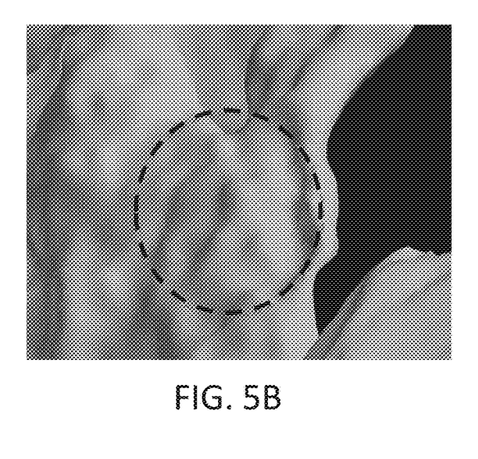
Figure 5C:
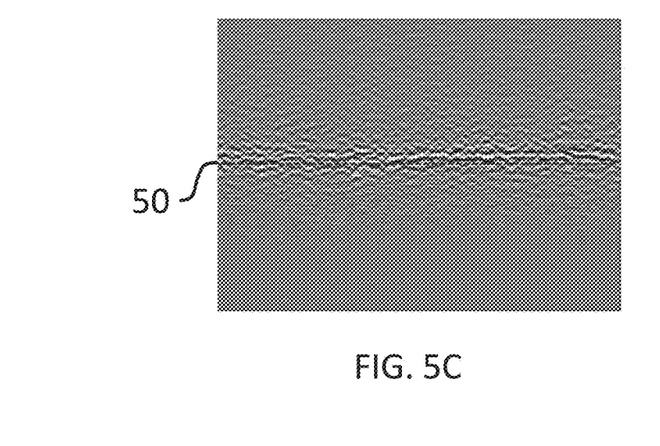
Figure 5D:
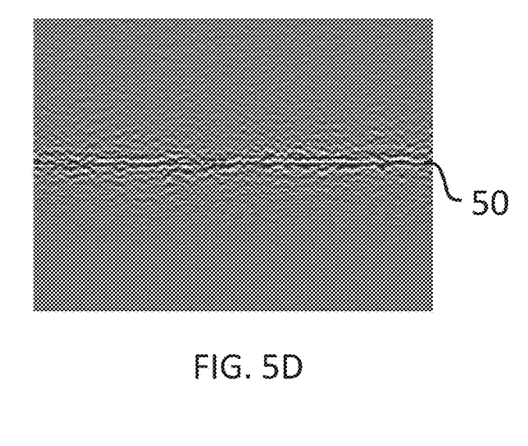

Another example of the present invention is shown in FIGS. 5A-5D. FIG. 5A is a map-view of an initial interpreted salt top. After following the embodiment in method 100, the salt top was updated to the one seen in FIG. 5B. Note the differences inside the dashed circle. The time-cross-correlation for FIG. 5A is in FIG. 5C, where the zero-time is indicated by dashed line 50. The time-cross-correlation for FIG. 5B is in FIG. 5D, also with zero-time dashed line 50, demonstrating that new salt surface is well positioned and makes time-cross-correlation window much flatter and focused on zero-time location.

The method 100 may be repeated to further refine the location of the salt surface. The seismic imaging may be repeated for each updated subsurface model. The method may be done for the salt top, then the salt base.

The proper placement of the salt surfaces allows improved seismic imaging beneath and around the salt. Salt bodies have low permeability and, as such, are good hydrocarbon traps. Improved seismic imaging around the salt aids in identification and delineation of potential hydrocarbon reservoir, allowing economic viability estimation and well placement.

Figure 6:
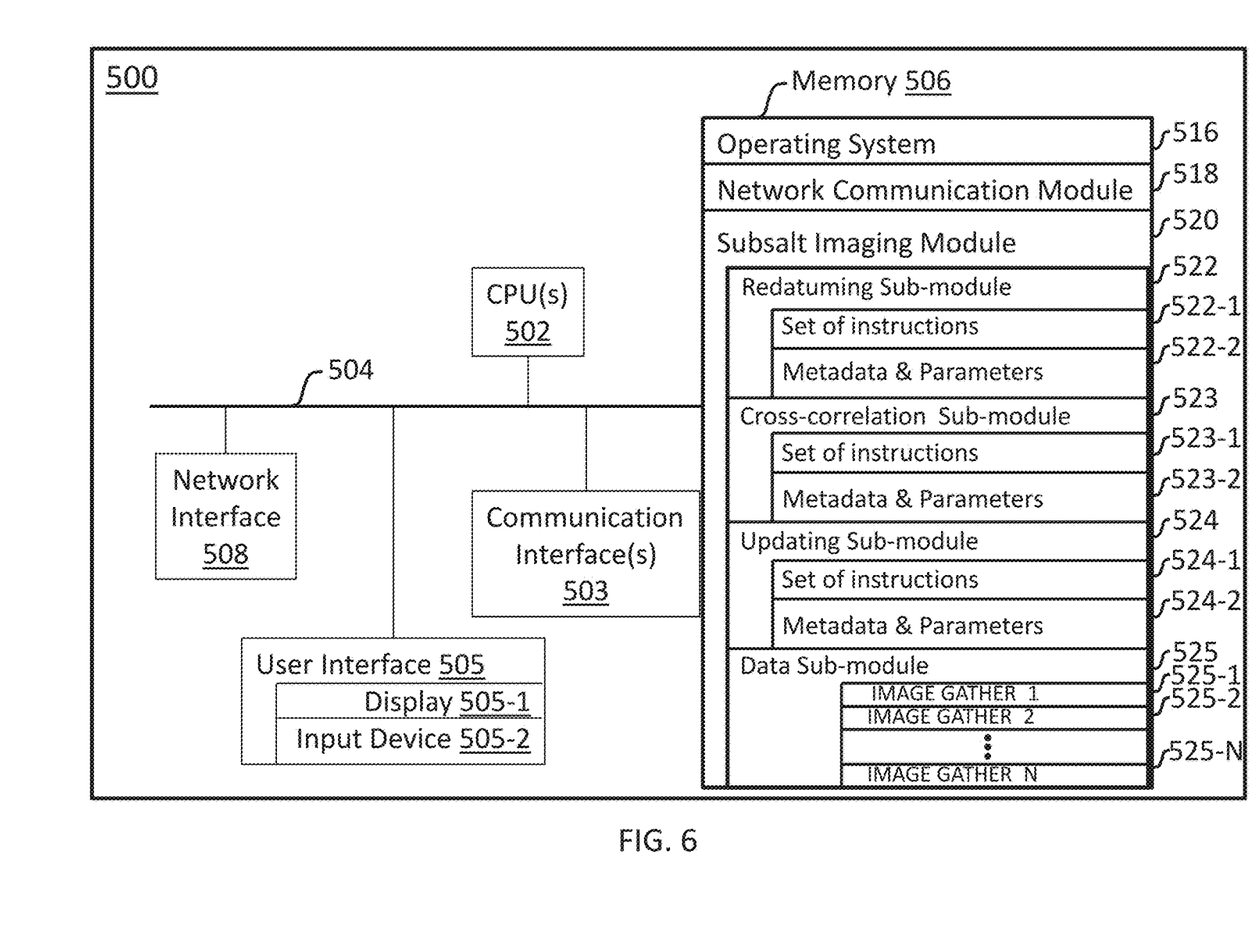
FIG. 6 is a block diagram illustrating a subsalt imaging system, in accordance with some embodiments.

FIG. 6 is a block diagram illustrating a subsalt imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the subsalt imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the subsalt imaging module 520 executes the operations of method 100. Subsalt imaging module 520 may include data sub-module 525, which handles the seismic dataset including seismic image gathers 525-1 through 525-N. This seismic data is supplied by data sub-module 525 to other sub-modules.

Redatuming sub-module 522 contains a set of instructions 522-1 and accepts metadata and parameters 522-2 that will enable it to execute operation 11 of method 100. The cross-correlation sub-module 523 contains a set of instructions 523-1 and accepts metadata and parameters 532-2 that will enable it to execute, for example, operation 12 of method 100. The updating sub-module 524 contains a set of instructions 524-1 and accepts metadata and parameters 524-2 that will enable it to execute at least operations 14 and 15 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generating the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Traditional velocity model building methods have limitations in resolving small-scale or short wavelength features. We proposed a new approach to automatically update these small-scale features in velocity models during the imaging process. We converted estimated time delays calculated from the time-crosscorrelation window to depth shifts, and then used surface warping to reconstruct the top of salt. By applying this technique iteratively, we can adjust the short-wavelength details in top of salt to enhance the subsalt imaging.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

Biondi, B., and P. Sava, 1999, Wave equation migration velocity analysis: 69th Annual International Meeting, SEG, Expanded Abstracts, 1723-1726.

Etgen, J. T., I. Ahmed, and M. Zhou, 2014, Seismic adaptive optics: 84th Annual International Meeting, SEG, Expanded Abstracts, 4411-4415.

Hill, N. R., 2014, Beam inversion by Monte Carlo back-projection: U. S. Patent Office Application 2014/0278299.

Shan, G., Y. Wang, and U. Albertin, 2014, Wave equation migration velocity analysis by wavefield decomposition: 84th Annual International Meeting, SEG, Expanded Abstracts, 4680-4685.

Sirgue, L., and R. G. Pratt, 2003, Waveform inversion under realistic conditions: Mitigation of nonlinearity: 83rd Annual International Meeting, SEG, Expanded Abstracts, 694-697.

Stork, C., 1992, Reflection tomography in the postmigrated domain: Geophysics, 57, 680-692.

What is claimed is:

1. A computer-implemented method for subsalt seismic imaging, comprising:
   a. receiving, at a computer processor, a seismic dataset representative of a subsurface volume of interest including a salt body and at least one initial subsurface model;
   b. redatuming, via the computer processor, a source wavefield and a receiver wavefield to a surface of the salt body to create a redatumed source wavefield and a redatumed receiver wavefield;
   c. cross-correlating, via the computer processor, the redatumed source wavefield and the redatumed receiver wavefield to produce a time cross-correlation window for each point on the surface of the salt body;
   d. analyzing, via the computer processor, time differences in the time cross-correlation window to determine errors in location of the surface of the salt body;
   e. updating, via the computer processor, the surface of the salt body to generate updated subsurface model; and
   f. using the updated subsurface model for subsalt seismic imaging.

2. The method of claim 1 wherein a plurality of initial subsurface models are received and the redatuming uses the plurality of initial subsurface models.

3. The method of claim 2 wherein the plurality of initial subsurface models comprises two or more of velocity models, attenuation models, smoothed velocity models, models including salt, and models without salt.

4. The method of claim 1 wherein the updating the surface of the salt body uses a surface warping method with Discrete Smooth Interpolation and preconditioning.

5. The method of claim 1 wherein the redatuming produces time-lag gathers.

6. The method of claim 1 further comprising non-linear iterative imaging with reverse time migration.

7. The method of claim 6 further comprising fine-scale tuning of features on the surface of the salt body.

8. A computer system, comprising:
   one or more processors;
   memory; and
   one or more programs, wherein the one or more programs are stored in the memory and configured to be executed by the one or more processors, the one or more programs including instructions that when executed by the one or more processors cause the device to execute:
   a. receiving, at the one or more processors, a seismic dataset representative of a subsurface volume of interest including a salt body and at least one initial subsurface model;
   b. redatuming, via the one or more processors, a source wavefield and a receiver wavefield to a surface of the salt body to create a redatumed source wavefield and a redatumed receiver wavefield;
   c. cross-correlating, via the one or more processors, the redatumed source wavefield and the redatumed receiver wavefield to produce a time cross-correlation window for each point on the surface of the salt body;
   d. analyzing, via the one or more processors, time differences in the time cross-correlation window to determine errors in location of the surface of the salt body;
   e. updating, via the one or more processors, the surface of the salt body to generate an updated subsurface model; and
   f. using the updated subsurface model for subsalt seismic imaging.

9. A non-transitory computer readable storage medium storing one or more programs, the one or more programs comprising instructions, which when executed by an electronic device with one or more processors and memory, cause the device to execute the steps of:
   a. receiving, at the one or more processors, a seismic dataset representative of a subsurface volume of interest including a salt body and at least one initial subsurface model;
   b. redatuming, via the one or more processors, a source wavefield and a receiver wavefield to a surface of the salt body to create a redatumed source wavefield and a redatumed receiver wavefield;
   c. cross-correlating, via the one or more processors, the redatumed source wavefield and the redatumed receiver wavefield to produce a time cross-correlation window for each point on the surface of the salt body;
   d. analyzing, via the one or more processors, time differences in the time cross-correlation window to determine errors in location of the surface of the salt body;
   e. updating, via the one or more processors, the surface of the salt body to generate an updated subsurface model; and
   f. using the updated subsurface model for subsalt seismic imaging.

* * * * *